(12) United States Patent
Kim et al.

(10) Patent No.: US 8,804,550 B2
(45) Date of Patent: Aug. 12, 2014

(54) METHOD AND APPARATUS FOR REUSE OF ADAPTIVE PARTIAL FREQUENCY IN A CELLULAR MOBILE COMMUNICATION SYSTEM

(75) Inventors: Dong-Hee Kim, Yongin-si (KR); Jae-Chon Yu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 902 days.

(21) Appl. No.: 12/992,277

(22) PCT Filed: May 26, 2009

(86) PCT No.: PCT/KR2009/002778
§ 371 (c)(1),
(2), (4) Date: Nov. 12, 2010

(87) PCT Pub. No.: WO2009/145546
PCT Pub. Date: Dec. 3, 2009

(65) Prior Publication Data
US 2011/0090861 A1    Apr. 21, 2011

(30) Foreign Application Priority Data

May 26, 2008    (KR) .......................... 10-2008-0048871

(51) Int. Cl.
*H04W 16/04*    (2009.01)

(52) U.S. Cl.
USPC .......................................... 370/252; 455/447

(58) Field of Classification Search
USPC .......................................... 370/252; 455/447
See application file for complete search history.

(56) References Cited

U.S. PATENT DOCUMENTS

| | | | |
|---|---|---|---|
| 2007/0183522 A1* | 8/2007 | Garrett et al. | ................. 375/260 |
| 2008/0032731 A1* | 2/2008 | Shen et al. | .................... 455/522 |
| 2008/0057934 A1 | 3/2008 | Sung et al. | |

OTHER PUBLICATIONS

Stolyar, et al.; Self-organizing Dynamic Fractional Frequency Reuse in OFDMA Systems; Proc. IEEE INFOCOM; Apr. 2008 (9pp).

Yeom, et al; Mitigation of Inter-Cell Interference in the WiMAX System; IEEE Mobile WiMAX Symposium; pp. 26-31; Mar. 2007 (6pp).

* cited by examiner

*Primary Examiner* — Melvin Marcelo

(74) *Attorney, Agent, or Firm* — The Farrell Law Firm, P.C.

(57) ABSTRACT

Disclosed is an adaptive partial frequency reuse method and system in a cellular mobile communication system. The adaptive partial frequency method includes the steps of: receiving interference feedback information transmitted from at least one terminal; determining if there is a terminal located in a cell boundary, based on the received interference feedback information; when there is the terminal located in the cell boundary, dividing the frequency band into multiple frequency sub-bands, and allocating different power to the respective multiple frequency sub-bands for each of the at least one base station; and providing data service to the terminal by using the power allocated the respective frequency sub-bands.

8 Claims, 5 Drawing Sheets

METHOD AND APPARATUS FOR REUSE OF ADAPTIVE PARTIAL FREQUENCY IN A CELLULAR MOBILE COMMUNICATION SYSTEM

TECHNICAL FIELD

The present invention relates to a cellular mobile communication system, and more particularly to an adaptive partial frequency reuse method and apparatus in a cellular mobile communication system.

BACKGROUND ART

In general, in order to efficiently use limited frequency resources, a cellular communication system employs the same frequency resource in two spatially distant areas. Such use of the same frequency resource in two distant areas is referred to as "frequency reuse". Hereinafter, a frequency reuse scheme in a cellular mobile communication system will be described with reference to FIG. 1.

Referring to FIG. 1, all node Bs 115, 125, 135 use the same frequency band f1 to provide communication services to mobile terminals located in corresponding cells A, B, and C 110, 120, 130. When all cells use the same frequency band in this way, the frequency reuse factor is 1. The case where the frequency reuse factor is 1, that is, the case where all cells use the same frequency band, has an advantage over the case where the frequency reuse factor is 2, that is, the case where neighbor cells use different frequency bands and every other cell uses the same frequency band, in that resource utilization can be maximized.

However, when a terminal 140 is located in a cell boundary, as shown in FIG. 1, using the frequency reuse factor of 1 causes the terminal to be much affected by interference from neighbor cells because all cells A, B, and C use the same frequency band f1. Accordingly, there is a problem in that using the frequency reuse factor of 1 limits a data transfer rate serviceable to terminals located in a cell boundary.

The frequency band is divided into several sub-bands. FIG. 2 is a view for explaining a power allocation state according to frequency sub-bands of cells A and B when the frequency reuse factor is 1, as shown in FIG. 1.

Referring to FIG. 2, the same power is allocated to sub-bands 1, 2, and 3 for both cell A and cell B. However, when a terminal located in a boundary between cell A and cell B makes communication in sub-band 1, there is a problem in that the same amount of interference is caused between the respective frequency sub-bands because the same power is allocated to sub-band 1 of cell A and sub-band 1 of cell B.

DISCLOSURE

Technical Problem

In the conventional technology as described above, when a frequency reuse factor of 1 is employed in order to maximize resource utilization, there is a problem in that serious interference is caused between cells. Further, there is another problem in that a data transfer rate serviceable to terminals located in a cell boundary is limited.

Accordingly, the present invention has been made to solve the above-mentioned problems occurring in the prior art, and the present invention provides a system and method for maximizing a frequency reuse factor by adaptively controlling transmit power of neighbor base stations.

Further, the present invention provides a system and method for increasing a data transfer rate for terminals located in a cell boundary.

Technical Solution

In accordance with an aspect of the present invention, there is provided an adaptive partial frequency reuse method in a mobile communication system including at least one base station using the same frequency band and a central controller for coordinately controlling the at least one base station, the adaptive partial frequency reuse method including the steps of: receiving interference feedback information transmitted from at least one terminal; determining if there is a terminal located in a cell boundary, based on the received interference feedback information; when there is the terminal located in the cell boundary, dividing the frequency band into multiple frequency sub-bands, and allocating different power to the respective multiple frequency sub-bands for each of the at least one base station; and providing data service to the terminal by using the power allocated to the respective frequency sub-bands.

In accordance with another aspect of the present invention, there is provided an adaptive partial frequency reuse system in a mobile communication system, the adaptive partial frequency reuse system including: at least one terminal for measuring interference from a serving cell and neighbor cells, and transmitting interference feedback information to a corresponding base station of at least one base station; the at least one base station for collecting the interference feedback information transmitted from terminals located in a corresponding cell, and transmitting the collected interference feedback information to a central controller, the at least one base station using the same frequency band; and the central controller for determining if there is a terminal located in a cell boundary, based on the received interference feedback information, and controlling each of the at least one base station to divide the frequency band into multiple frequency sub-bands and allocate different power to the respective multiple frequency sub-bands thereof when there is the terminal located in the cell boundary.

Advantageous Effects

According to the present invention as described above, when a terminal is located in a cell boundary, inter-cell interference in providing service to the terminal can be reduced by allocating different power to respective corresponding frequency sub-bands for neighbor cells adjoining the terminal.

Further, different power is allocated to respective corresponding frequency sub-bands for neighbor cells only when there is a terminal located in a cell boundary, and the same power is allocated for the neighbor cells when there is no terminal located in a cell boundary. Therefore, there is an advantage in that a resource use factor can be maximized, and the overall cell throughput can be improved.

BRIEF DESCRIPTION OF THE DRAWINGS

The above and other objects, features and advantages of the present invention will become more apparent from the following detailed description taken in conjunction with the accompanying drawings, in which.

BEST MODE

Mode for Invention

Figure 1:
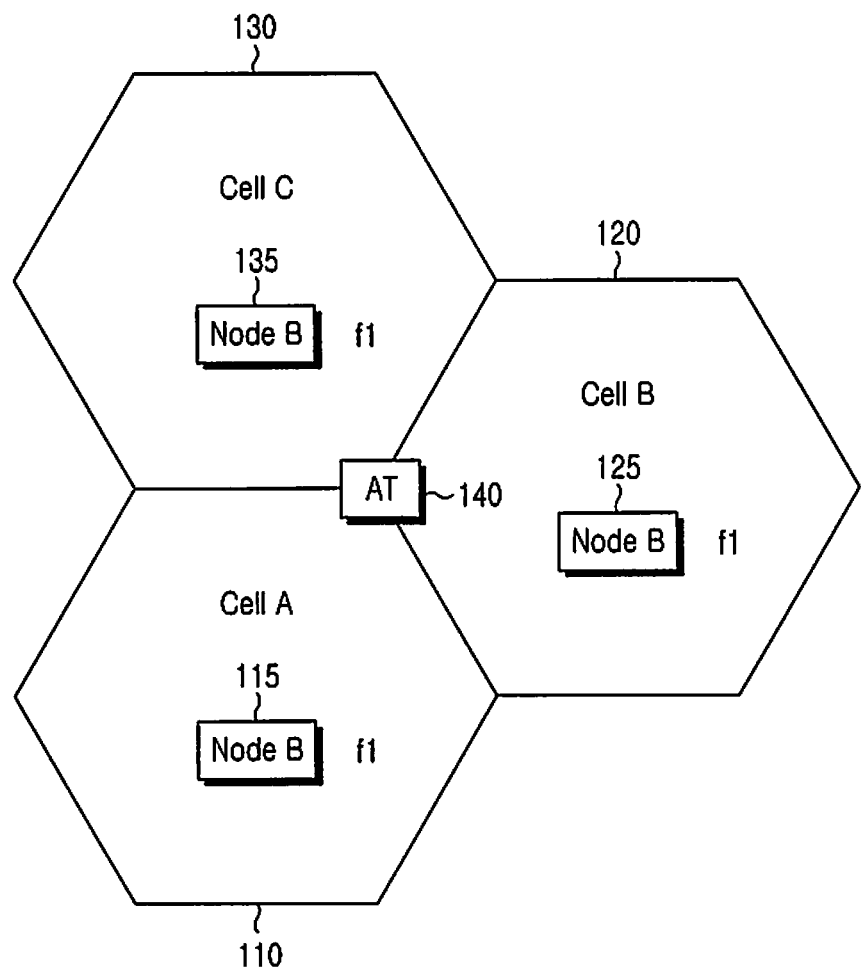
FIG. 1 is a view for explaining a frequency reuse scheme in a cellular mobile communication system.
Figure 2:
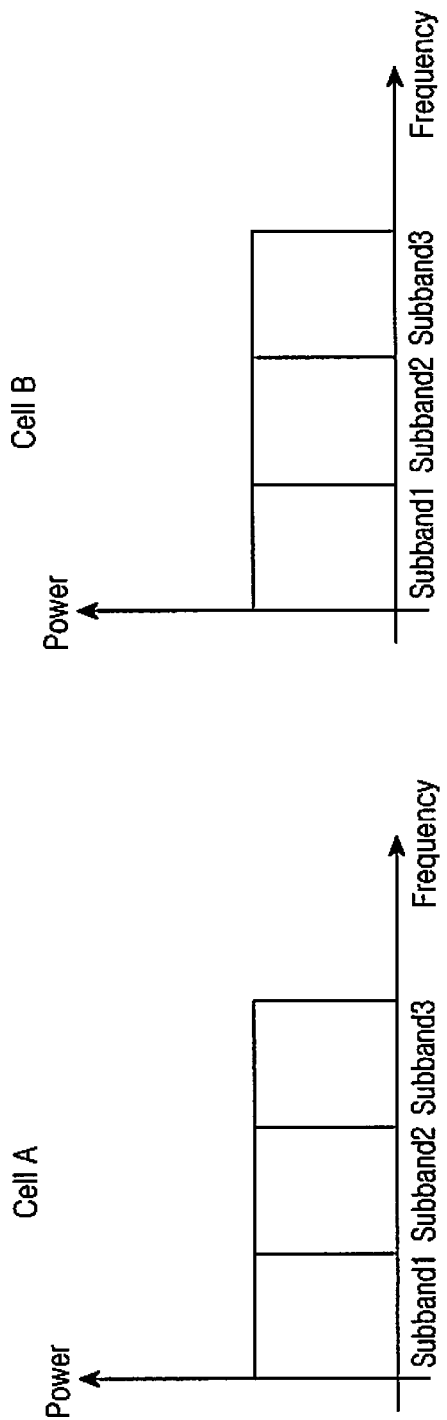
FIG. 2 is a view for explaining the prior art power allocation to respective frequency sub-bands when a frequency reuse factor is 1.

Hereinafter, exemplary embodiments of the present invention will be described with reference to the accompanying drawings. In the following description, only parts necessary for understanding operations of the present invention will be described. However, those skilled in the art will appreciate that the disclosed concepts and concrete embodiments of the invention as described below to solve the technical problem of the invention may be changed or modified. Further, those skilled in the art will appreciate that the disclosed concepts and structures and equivalents thereof do not depart from the scope and spirit of the invention in the widest form as disclosed in the accompanying claims. In the following description, the same elements will be designated by the same reference numerals although they are shown in different drawings. Further, a detailed description of known functions and configurations incorporated herein will be omitted so as not to make the subject matter of the present invention rather unclear. The terms as used in the following description are defined considering the functions in the present invention and may vary depending on the intention or usual practice of a user or operator. Therefore, the definitions should be made based on the entire contents of the description.

The present invention proposes a method and system for dividing the entire frequency band into multiple frequency sub-bands, and then allocating different power to the respective frequency sub-bands. That is, a frequency reuse factor is different for each of the frequency sub-bands.

To this end, the system of the present invention is provided with a central controller that can coordinately control respective base stations located in multiple cells. The central controller controls the power of frequency sub-bands for each cell in real time in such a manner that a frequency reuse factor other than 1 is used only when service is provided to terminals located in a cell boundary. That is, a data transfer rate serviceable to terminals located in a cell boundary can be increased by using a frequency reuse factor other than 1, if necessary, and resources can be efficiently used by minimizing the period of time during which the frequency reuse factor other than 1 is used.

Figure 3:
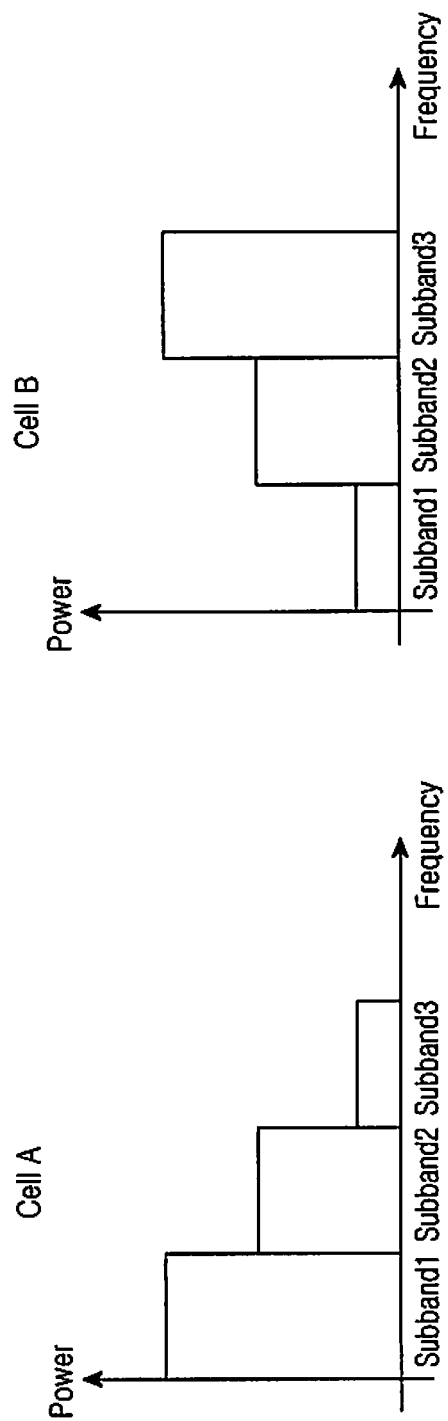
FIG. 3 is a view for explaining power allocation during partial frequency reuse in accordance with an exemplary embodiment of the present invention.

FIG. 3 illustrates an example of power allocation for each cell in the case of an adaptive partial frequency reuse scheme according to an exemplary embodiment of the present invention.

Neighbor cells A and B are preset such that power is allocated as shown in FIG. 3.

For sub-band 1, cell A uses higher-level power whereas cell B uses lower-level power. This shows a similar result to using a frequency reuse factor of 2. Accordingly, when a terminal located in a boundary between cells A and B uses sub-band 1, the terminal can be provided with service from cell A serving at a higher power level while inter-cell interference is minimized.

In contrast with this, terminals located close to the base station of cell A or B are provided with service through sub-band 1 corresponding to a frequency reuse factor of 1, which maximizes resource utilization. That is, cells A and B can simultaneously provide service to the terminals located in the corresponding cell by using the same sub-band 2.

However, when a base station uses predetermined fixed power as shown in FIG. 3, it is difficult to adaptively utilize partial frequency reuse depending on movements of terminals. For example, if predetermined lower power is allocated to sub-band 1 of cell B, as shown in FIG. 3, even when there is no terminal in a cell boundary, then the overall throughput is decreased.

Therefore, the present invention proposes a way to allocate different level power to sub-bands into which the entire frequency band is divided and simultaneously employ adaptive partial frequency reuse according to whether or not terminals are located in a cell boundary.

Figure 4:
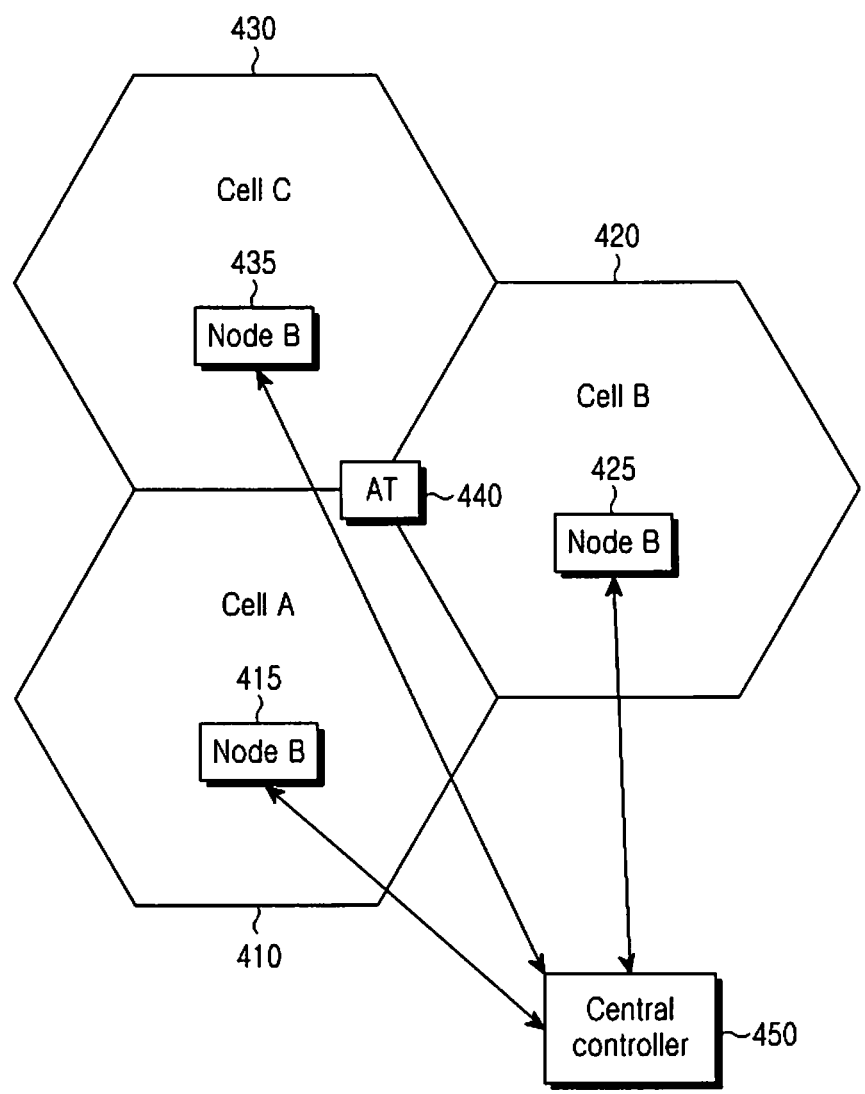
FIG. 4 is a view illustrating a cellular mobile communication system including a central controller for power allocation during adaptive partial frequency reuse in accordance with an exemplary embodiment of the present invention.

FIG. 4 illustrates an adaptive partial frequency reuse system according to an exemplary embodiment of the present invention.

Referring to FIG. 4, the adaptive partial frequency reuse system includes node Bs 415, 425, 435 controlling cells A, B, and C 410, 420, 430 respectively, and a central controller 450, connected to the node Bs 415, 425, 435, for coordinately controlling neighbor cells.

The central controller 450 may be a separately formed apparatus as shown in FIG. 4, or any one of the node Bs may serve as the central controller 450.

The node Bs 415, 425, 435 receive and collect interference feedback information including information on interference from neighbor cells, as well as the overall interference of each terminal, transmitted from all terminals within the corresponding cell, and transmits the interference feedback information to the central controller 450.

The overall interference information for each terminal may include all possible parameters providing the overall interference information for a terminal, such as CQI (Channel Quality Indication) and SINR (Signal-to-Interference Noise ratio).

The central controller 450 determines a distribution of terminals, based on the interference feedback information transmitted via the node Bs 415, 425, 435, and controls the power of a frequency sub-band for use in transmission to a corresponding terminal according to the determined distribution of terminals. That is, the central controller 450 collects interference feedback information for terminals, transmitted from the node Bs 415, 425, 435 of the respective cells, to thus use the collected interference feedback information for scheduling of the respective node Bs, and determine an appropriate terminal to be scheduled for each frame, a data transfer rate, and power to be used in transmission.

Reference will now be made to an adaptive partial frequency reuse method in the system as described above.

First of all, an operation of transmitting interference feedback information by a terminal according to an exemplary embodiment of the present invention will be described with reference to FIG. 5.

Figure 5:
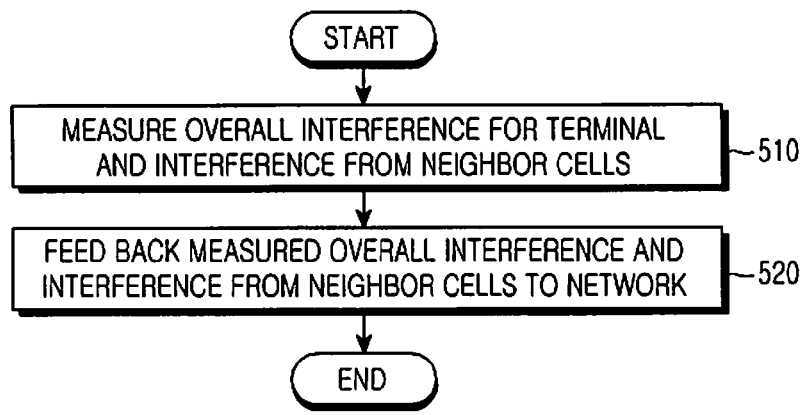
FIG. 5 is a flowchart for explaining a feedback operation of a terminal in accordance with an exemplary embodiment of present invention.

Referring to FIG. 5, in step 510, the terminal measures the overall interference of its serving cell, and additionally measures interference from neighbor cells coordinately controlled by the central controller 450. In step 520, the terminal transmits interference feedback information including the measured overall interference and the measured interference from neighbor cells to the base station of the serving cell.

For example, it is assumed in FIG. 4 that the terminal 440 is currently served by cell A, in other words, the serving cell of the terminal 440 is cell A, and the terminal 440 measures interference from two neighbor cells B and C. Then, the terminal 440 configures interference feedback information by including the overall interference Io, interference from cell B, I_B, and interference from cell C, I_C therein, and transmits the configured interference feedback information to its serving node B 415. The interference included in the interference feedback information may be used for the central controller 450 to perform scheduling of the node Bs coordinately controlled by the central controller 450.

Hereinafter, an adaptive partial frequency reuse method using interference feedback information transmitted from a terminal according to an exemplary embodiment of the present invention will be described with reference to FIG. 6.

Figure 6:
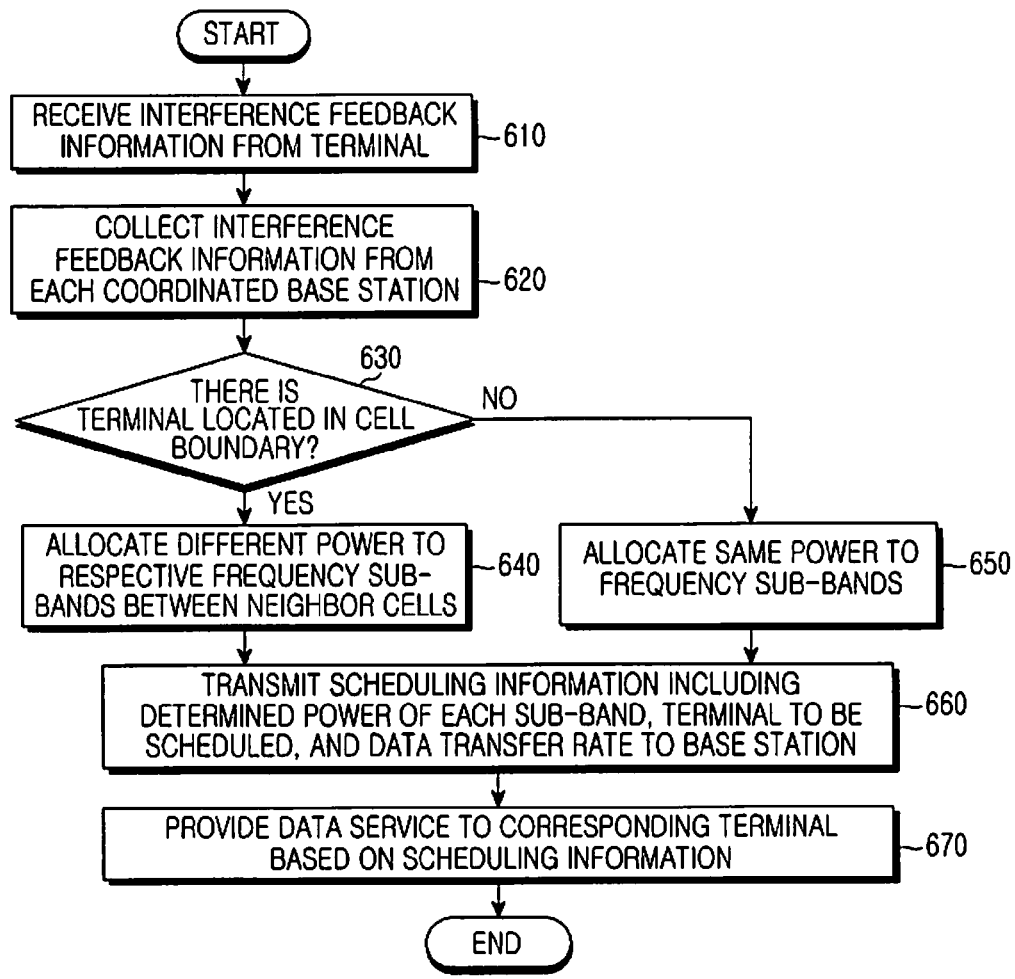
FIG. 6 is a flowchart for explaining a network operation in accordance with an exemplary embodiment of the present invention.

Referring to FIG. 6, in step 610, each base station receives interference feedback information from at least one terminal located within a corresponding cell. The interference feedback information includes the overall interference of a corresponding terminal and interference from neighbor cells. In step 620, each base station then delivers the received interference feedback information to the central controller. In step 630, the central controller determines a distribution of terminals, based on the delivered interference feedback information. That is, in step 630, the central controller determines if there is a terminal located in a cell boundary.

According to an exemplary embodiment of the present invention, the central controller determines if there is a terminal located in a cell boundary, in the following manner:

The central controller compares the CQI of the serving cell for a corresponding terminal with interference from each neighbor cell one by one, and determines if a difference value therebetween is equal to or less than a specific threshold. When the difference value is equal to or less than the threshold as a result of the determination, the central controller determines the corresponding terminal to be located in a cell boundary.

The above-mentioned determination may be extended to several cells. As an example, a description will be given of the case where cell A is the serving cell of a terminal, and cells B and C are neighbor cells.

When interference feedback information for the terminal includes information indicating that the CQI of the serving cell is 4 dB, interference from cell B is 0 dB, and interference from cell C is 2 dB, the difference value between the CQI of the serving cell and the interference from cell B is 4 dB, and the difference value between the CQI of the serving cell and the interference from cell C is 2 dB. Assuming that the specific threshold is 3 dB, the difference value between the CQI of the serving cell and the interference from cell C, that is, 2 dB, is less than the specific threshold of 3 dB, and thus the terminal is determined to be located in a cell boundary.

However, the determination as described above is merely an example of determining if a terminal is located in a cell boundary, and the present invention is not limited thereto.

When there is a terminal located in a cell boundary as a result of the determination in step 630, the central controller controls each base station in step 640 to allocate different power to respective frequency sub-bands, as shown in FIG. 3. However, when there is no terminal located in a cell boundary as a result of the determination in step 630, the central controller controls each base station in step 650 to allocate the same power to respective frequency sub-bands between the neighbor cells.

In step 660, the central controller transmits scheduling information including power to be used in each frequency sub-band by each base station, a terminal to be scheduled, and a data transfer rate to the corresponding base station.

In step 660, each base station uses the scheduling information to provide data service to the terminal. In providing data service to the terminal by each base station in step 660, the base stations coordinately controlled as described above use the interference feedback information transmitted from the terminal to adaptively determine the power of frequency sub-bands. That is, different power is allocated to respective frequency sub-bands between neighbor cells, as shown in FIG. 3, only when data service needs to be provided to terminals located in a cell boundary, and the same power is allocated to the frequency sub-bands between neighbor cells when data service is provided to terminals not located in a cell boundary. In this way, resource utilization can be maximized, and the overall throughput can be improved.

Although the above embodiment in FIG. 3 has showed that power allocated to respective frequency sub-bands are all different, it is merely an example, and does not limit the present invention. That is, for example, it is possible to allocate the same power to two of the three sub-bands in FIG. 3, and allocate different power to the other sub-band.

Further, although the above embodiments have described downlink, that is, data service from a base station to a terminal, the present invention may be applied to uplink, that is, transmission from a terminal to a base station. In this case, the central controller determines not the power of a base station, but the power of a terminal.

Although several preferred embodiments of the present invention have been described for illustrative purposes, those skilled in the art will appreciate that various modifications, additions and substitutions are possible, without departing from the scope and spirit of the invention in the widest form as disclosed in the accompanying claims.

The invention claimed is:

1. An adaptive partial frequency reuse method in a mobile communication system including at least one base station using the same frequency band and a central controller for coordinately controlling the at least one base station, the adaptive partial frequency reuse method comprising the steps of:
   receiving interference feedback information transmitted from at least one terminal;
   determining if there is a terminal located in a cell boundary, based on the received interference feedback information;
   dividing, when there is the terminal located in the cell boundary, the frequency band into multiple frequency sub-bands, and allocating different power to the respective multiple frequency sub-bands for each of the at least one base station;
   allocating, when there is no terminal located in the cell boundary, a same power to the multiple frequency sub-bands; and
   providing data service to the terminal by using the power allocated to the respective frequency sub-bands.

2. The adaptive partial frequency reuse method as claimed in claim 1, wherein the interference feedback information includes an overall interference for the corresponding terminal and interference from neighbor cells.

3. The adaptive partial frequency reuse method as claimed in claim 1, wherein the interference feedback information comprises information on a ratio of interference for each cell to the overall interference.

4. The adaptive partial frequency reuse method as claimed in claim 1, wherein the step of determining if there is the terminal located in the cell boundary comprises the steps of:
    comparing an overall interference of a serving cell and interference from each neighbor cell, transmitted from the at least one terminal, one by one; and
    when a difference value between the overall interference and the interference from each neighbor cell is equal to or less than a specific threshold, determining the terminal to be located in the cell boundary.

5. An adaptive partial frequency reuse system in a mobile communication system, the adaptive partial frequency reuse system comprising:
    at least one terminal for measuring interference from a serving cell and neighbor cells, and transmitting interference feedback information to a corresponding base station of at least one base station;
    the at least one base station for collecting the interference feedback information transmitted from terminals located in a corresponding cell, and transmitting the collected interference feedback information to a central controller, the at least one base station using the same frequency band; and
    the central controller for determining if there is a terminal located in a cell boundary, based on the received interference feedback information, and controlling each of the at least one base station to divide the frequency band into multiple frequency sub-bands, allocate different power to the respective multiple frequency sub-bands thereof when there is the terminal located in the cell boundary, and allocate a same power to the multiple frequency sub-bands when there is no terminal located in the cell boundary.

6. The adaptive partial frequency reuse system as claimed in claim 5, wherein the interference feedback information includes an overall interference for the corresponding terminal and interference from neighbor cells.

7. The adaptive partial frequency reuse system as claimed in claim 5, wherein the interference feedback information comprises information on a ratio of interference for each cell to the overall interference.

8. The adaptive partial frequency reuse system as claimed in claim 5, wherein the central controller compares an overall interference of a serving cell and interference from each neighbor cell, transmitted from the at least one terminal, one by one, and determines the terminal to be located in the cell boundary, when a difference value between the overall interference and the interference from each neighbor cell is equal to or less than a specific threshold.

* * * * *